United States Patent [19]

Shima et al.

[11] 4,366,544

[45] Dec. 28, 1982

[54] JUDGING SYSTEM FOR DETECTING FAILURE OF MACHINE

[75] Inventors: Ichiji Shima; Hiroshi Teshima, both of Kansai Electric Power Company Incorporated, Sohgo Gijyutsu Kenkyusho, No. 1, Nakohji Ichinotsubo, Amagasaki-shi, Hyogo-ken, Japan; Takayuki Koizumi; Satoru Inoue, both of Amagasaki, Japan

[73] Assignees: Mitsubishi Denki Kabushiki Kaisha, Tokyo; Ichiji Shima; Hiroshi Teshima, both of Amagasaki, all of Japan

[21] Appl. No.: 140,832

[22] Filed: Apr. 16, 1980

[30] Foreign Application Priority Data

Apr. 16, 1979 [JP] Japan .................................. 54-46426

[51] Int. Cl.³ ........................ G08B 21/00; G01N 29/00
[52] U.S. Cl. ..................................... 364/550; 73/660; 340/683; 364/508
[58] Field of Search ............... 364/507, 508, 550, 551, 364/734; 340/665, 669, 682, 683; 73/579, 593, 660; 235/92 PE

[56] References Cited

U.S. PATENT DOCUMENTS

| | | | |
|---|---|---|---|
| 3,187,303 | 6/1965 | Chiapuzio et al. | 364/550 |
| 3,677,072 | 7/1972 | Weichbrodt et al. | 340/683 X |
| 3,841,149 | 10/1974 | Edwin et al. | 364/508 X |
| 3,913,084 | 10/1975 | Bollinger et al. | 73/660 X |
| 4,054,786 | 10/1977 | Vincent | 364/734 X |
| 4,156,280 | 5/1979 | Griess | 364/550 X |
| 4,165,458 | 4/1977 | Koizumi et al. | 235/92 PE |
| 4,209,779 | 6/1980 | Beck et al. | 340/683 |
| 4,270,041 | 5/1981 | Pleyber | 364/550 X |

OTHER PUBLICATIONS

Dyer et al., Detection of Rolling Element Bearing Damage by Statistical Vibration Analysis, Transactions of the ASME, Paper No. 77-DET-83, Oct. 28, 1977, pp. 1-7.

Ono et al., Diagnosis of Electric Rotary Machine, Journal of the Institute of Electrical Engineers, Japan, vol. 99, No. 3, Mar. 1979, pp. 16-18.

*Primary Examiner*—Felix D. Gruber
*Attorney, Agent, or Firm*—Oblon, Fisher, Spivak, McClelland & Maier

[57] ABSTRACT

A system for detecting whether a machine is in the normal or abnormal state by comparing detected values of waveforms of signals such as vibration generated from the machine with a set value a plurality of times to indicate failure of the machine when the detected values reach the set value a predetermined number of times.

5 Claims, 4 Drawing Figures

F I G. 3
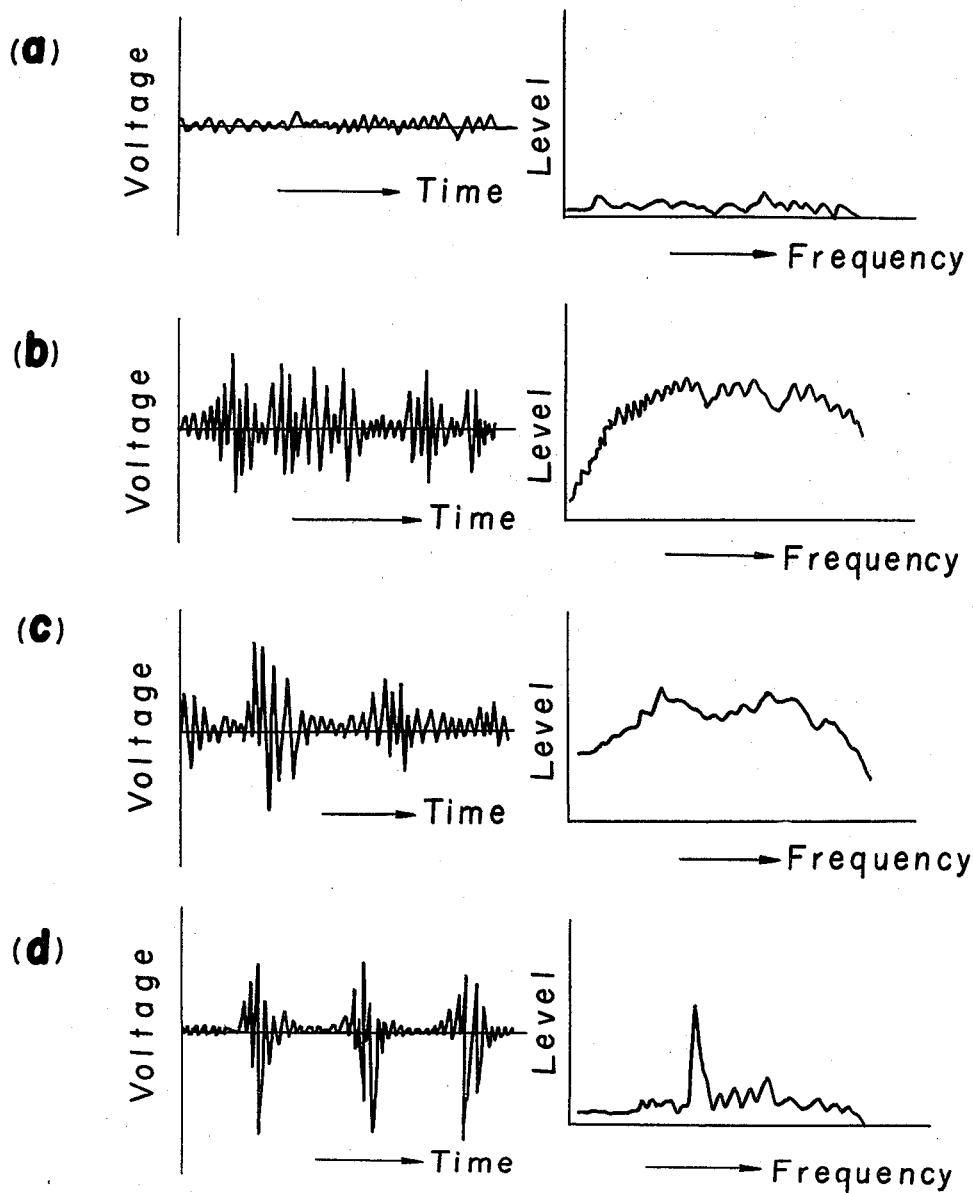

JUDGING SYSTEM FOR DETECTING FAILURE OF MACHINE

BACKGROUND OF THE INVENTION

1. Field of the Invention

The present invention relates to a highly accurate judging system for detecting a failure of a machine to indicate a possible fault.

2. Description of the Prior Art

FIG. 1 shows one embodiment of the conventional judging system for detecting a failure.

Referring to FIG. 1, the conventional judging system for detecting the bearing failure will be described. In the block diagram of FIG. 1, the reference numeral (1) designates a sensor-amplifier unit which detects sampling signals representative of the bearing vibration of a machine (not shown) and amplifies the detected signals as desired. An effective value detection unit (2) and a peak value detection unit (3) which detect respectively the effective values and the peak values of the output signals from the sensor-amplifier (1) are connected to the output of the sensor-amplifier (1). Comparator units (4), (5) are respectively connected to the outputs of the effective value detection unit (2) and the peak value detection unit (3) so as to compare the outputs of the effective value and the peak value with the set values. A discrimination unit is connected to the outputs of the comparator units (4), (5) so as to judge whether it is in the normal state or the abnormal state depending upon the results of the comparisons in the comparison units (4), (5). The discrimination unit (6) output is fed to the display unit (7).

When the judging system is used for detecting whether or not bearing failure has occurred by detecting either the abnormal state or the normal state, various problems are found.

In a first instance, there are the problems with the values obtained by the effective value detection unit (1) and the peak value detection unit (5) because of a possibility ot an error in the peak value depending upon the frequency component of the waveform and secondly there arises the problem of an erroneous operation.

Usually this judging unit is used in a practical driving of the machine. In that case, the shock waveform caused by the starting or the stopping or the external disturbance in a maintenance operation may be erroneously judged to cause an abnormal state of the bearing as a bearing failure.

The erroneous judgement will be further described, especially the vibration phenomenon in the bearing failure will be described.

When the kind of the bearing is a rolling bearing, the possible abnormal phenomena include a seizure caused by a lubricant shortage, an impurity contamination and a failure caused by various parts of the bearing. In every case, the effective value or the peak value of the vibration is increased. The increased value will not be lowered except by treating the bearing in a certain manner.

A ratio of the increased value at the initial abnormal state which is caused by a lubricant etc., to the original value is only 3 to 5 times. The ratio is not substantially different from that of the external noise signal caused by the starting, the stopping and the installation. Therefore, it is premature to judge the bearing failure only by the increase of the effective value or the peak value.

SUMMARY OF THE INVENTION

The present invention is to provide a judging system for detecting an abnormal state of a machine with high accuracy. The judging system of the present invention can be connected to a bearing failure judging apparatus having a two step system for judging an abnormal state and then, judging the kind of bearing failure. The judging time can be shortened in comparison with the detailed judging operation for the times of non-abnormal states.

In accordance with the judging system of the present invention, vibration signals are sampled as detection signals and operations are carried out depending upon the sampled detection signals for certain times corresponding to the predetermined number of loops and the results of the operations are respectively compared each time with the set values and a possibility of the failure is judged depending upon the plural comparisons. The detected signals are amplified if desired and the amplified detected signals are fed through a low-pass filter to an A/D converter to convert the signals into digital signals and the digital signals are fed to an effective value arithmetic unit or a peak value arithmetic unit.

BRIEF DESCRIPTION OF THE DRAWINGS

FIG. 3 shows graphs illustrating some combinations of the time waveforms and the related frequency spectra, which are peculiar to the types of the failures of the bearing, respectively;

DETAILED DESCRIPTION OF THE PREFERRED EMBODIMENTS

Figure 2:
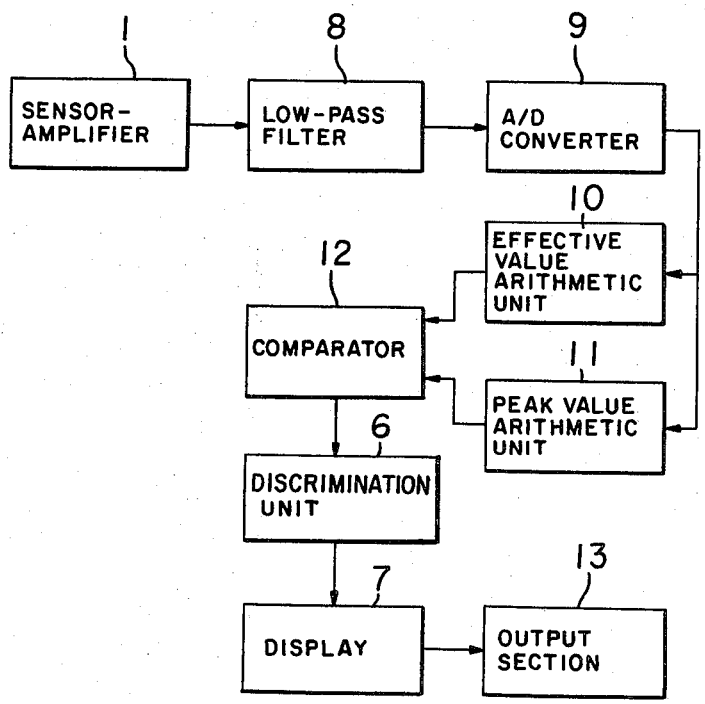
FIG. 2 is a block diagram of one embodiment of a judging system for detecting a bearing failure of the present invention.

Referring to FIG. 2, one embodiment of the present invention will be illustrated.

Figure 1:
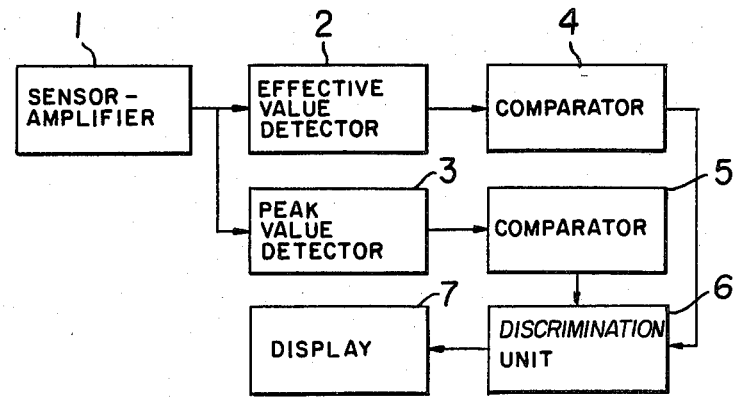
FIG. 1 is a block diagram of one embodiment of the conventional judging system.

In FIG. 2 the reference numeral (1) designates a sensor-amplifier unit which has the same structure as that of FIG. 1 and a low-pass filter (8) and an A/D converter (9) are connected in series to the output of the sensor-amplifier unit (1). The A/D converter (9) converts the output signals of the low-pass filter into digital signals. An effective value arithmetic unit (10) and a peak value arithmetic unit (11) are connected to the output of the A/D converter (9) so as to obtain effective values and peak values of the waveforms by their operations. The outputs of the arithmetic units (10), (11) are transmitted to a comparator unit (12) which compares set values depending upon the effective values and the peak values with operands obtained by the effective value arithmetic unit (10) and the peak value arithmetic unit (11) to output the result of the comparison. The reference numeral (6) designates a discrimination unit which judges a possibility of a bearing failure of a bearing (not shown) depending upon the data of the comparator unit (12) to output it to a display unit (7). One loop is formed by the effective value arithmetic unit (10), the peak value arithmetic unit (11), the comparator unit (12) and the judging unit (6). The accuracy of the judgement can be increased by repeating the operations for plural times. The reference numeral (13) designates an output of this judging system to transmit the output signals to a bearing failure judging apparatus (not shown) which is connected to the system of the present invention.

The operation of the judging system of the present invention will be illustrated.

The vibrations at a bearing are sampled at each desired sampling time and the sampled signals are detected and amplified by the sensor-amplifier unit (1) and are passed through the low-pass filter for preventing an error into the A/D converter (9) wherein the analogue signals are converted into the corresponding digital signals. The speed of the conversion is depending upon the upper frequency of vibration caused at the object bearing and is usually about 20,000 per second.

A required number of the serial quantized signals is depends upon the revolution per minute of the bearing and is limited depending upon capacities of memories in the arithmetic units (10), (11). The number is usually given as $2^n$ (n=8 to 10) i.e. from 256 to 1024.

The effective value of the waveform is obtained by the effective value arithmetic unit (10). This is easily obtained by the equation (1).

$$R = \sqrt{\frac{a_1^2 + a_2^2 + \ldots a_N^2}{N}} \quad (1)$$

wherein R designates the effective value; $a_i$ designates quantized signals; i=1, 2, ... N and $N=10^n$.

The operation in the peak value arithmetic unit (11) is simple as the equation (2).

$$P = Max < a_1, a_2 - a_N > \quad (2)$$

wherein P designates a peak value and Max < > designates a maximum value.

In the comparator unit (12), the effective value R and the peal value P are compared with the set values Rs and Ps. The signal for "large" is output in the case of Rs>R or Ps>P whereas the signal for "small" is output in the case of Rs<R and Ps<P. The discrimination unit (6) receives the signal output from the comparator unit (12) and indicates a possibility of a bearing failure when the output of comparitor 12 is "large" and to be the normal in the case of a "small" output. The series operations can be in plural loops. In such case, the signals corresponding to "large" or "small" are repeated for predetermined times for the loops. The data are collected in the judging unit (6), which judges to have a possibility of a bearing failure in the case of "large" for more than half of the loops or in the case of "large" for more than a predetermined number of the loops. The result is indicated to an operator by a lamp, a buzzer or the other manner on the display unit.

The probability of the result of the display will be described.

The operations are carried out for the times corresponding to the predetermined number of the loops and the possibility of the bearing failure is decided depending upon the results of comparisons for plural times and accordingly, the accuracy of the judgement is higher than that of the conventional system.

When said bearing failure judging apparatus is connected to this system, the input to said bearing failure judging apparatus is transmitted from the output (13) of this system. These operations and the display can be carried out by a microprocessor. The time required for the operations and the display is only several seconds to ten and several seconds for one object bearing in the case of about ten loops.

The condition of the connection of said bearing failure judging apparatus (not shown) to the output (13) will be briefly described.

Said bearing failure judging apparatus (not shown) starts its operation by receiving the alarm signal from the output (13) to carry out a detailed operation for the judgement in comparison with the system shown in FIG. 2 whereby it detects not only the abnormal state but also the kind of the abnormal mode. In such two step judgements, the time for the operation can be saved in comparison with the operation for the detailed judgement only by said bearing failure judging apparatus (not shown).

In accordance with the above-mentioned embodiment, the vibration value is used for the method of finding the abnormal state. Thus, the object phenomenon is not limited to the vibration of the machine which is tested by the judging system. For example, a sound signal fed from a bearing is also one of effective signals. In such case, the sensor is a microphone.

In the above-mentioned embodiment, both of the effective values and the peak values are operated. In accordance with many tests, the alarm for the failure can be provided only by the operation of the peak value in many cases. Therefore, it is possible to eliminate the effective value arithmetic unit so as to simplify the system and the algorithm.

In the above-mentioned embodiment, the judging system for detecting the bearing failure is described. Thus, the embodiment can be modified so as to apply to many other objects for judging operations.

Figure 4:
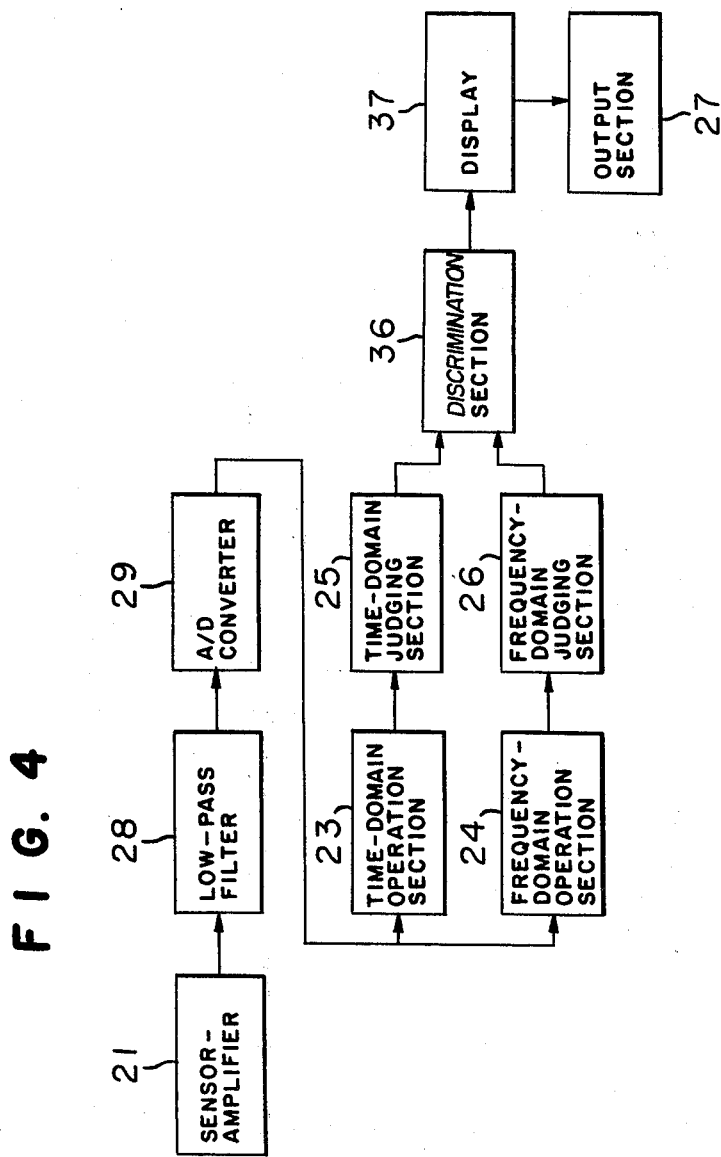
FIG. 4 shows block diagram of an embodiment of a bearing failure judging apparatus according to the invention.

The judging system for detecting an abnormal state of a machine can be connected to the bearing failure judging apparatus shown in FIG. 4 which judges and displays the type of a cause of a failure occurring in a bearing before the failure develops to seize or destroy the bearing, thus possibly leading to disastrous accident.

As known, various types of failures occur in a bearing, being attendant with a vibration. The vibration of the bearing with a failure will be described for each cause of a failure of a bearing, before preceeding with a bearing failure judging apparatus as an embodiment of the invention. Many experiments and the long experience of the inventors teach that most of failures of the bearing occurring in a practical use condition of the bearing generally comes under the following three;

(1) seizure coming from the lubricating oil shortage,
(2) presence of foreign matters and
(3) scars marked on the respective portions of the bearing.

Typical time-waveforms and frequency spectra of those three kinds of failures will be illustrated on the left and right sides in FIG. 3. FIG. 3(a) illustrates a vibration acceleration waveform and the frequency spectrum when a bearing is normal. As seen, the output voltage of the time-waveform is small and the level of the frequency spectrum is low. FIG. 3(b) shows an output voltage when the oil is short. The seizure of a slight shortage of oil causes a great voltage change, say, 3 to 5 times of the normal output voltage. The frequency spectrum in this case is analogous to that obtained as the result of the analysis of white noise. FIG. 3(c) illustrates those when foreign matters are mixed into the lubricating oil. In this case, foreign matters put between the rolling surface and balls, produce pulsate waveforms. The pulsate waves are random in the amplitudes and the intervals of their occurences. The frequency spectrum takes an idefinite shape due to the pulsating waves and the irregular waveform following the pulsate wave, as in the case of the oil shortage. FIG. 3(d) shows a waveform and the frequency spectrum when the bearing is scarred. As shown, pulsating waves occur at fixed periods and substantially fixed amplitude. The pulsating waves induce a resonant vibration in the portion marked with the scar of the bearing, so that marked proper peaks appear in the frequency spectrum. An additional feature of the time-waveform is a localization of the amplitudes of the wave. The cause of the localization is unapparent; however, it is estimated that the localization arises from a nonlinearity characteristic of the vibration system. This phenomenon of the localization is observed very frequently in the rolling bearing.

An embodiment of the invention was made on the findings as described above.

Referring now to FIG. 4, there is shown a failure judging apparatus as an embodiment of the invention. As shown, a sensor/amplifier section (21) with the same construction as that of FIG. 1 is connected at the output to an A/D converter (29) by way of a low-pass filter (28). The output of the A/D converter (29) is coupled with a time-domain operation section (23) and a frequency-domain operation section (24). Further, the time-domain section (23) is coupled at the output with a time-domain judging section (25) and the frequency-domain section (24) with a frequency-domain section (26). A judging section (36), receiving the output signals from those judging sections (25) and (26), is provided at the subsequent stage. A display section (37) provided following the judging section (36) displays the type of a cause of a failure of the bearing. At the output side of the display section (37), an output section (27) is further provided to transmit a signal to a bearing failure-restoring direction unit (not shown) to direct one to restore the failed bearing. The operation of the bearing failure judging apparatus is described in the prior patent application.

The effect of the combination of the judging system of this invention and the bearing failure judging apparatus of the prior application is to attain effective failure judging operation under reducing a loss time.

Firstly, the failure is found.

Secondly, a detected signal wave detected from a bearing is lead to a time-domain extracting means and a frequency-domain extracting means in order to extract features of the detected signal wave in the time-domain and features thereof in the frequency-domain. Through the processings of those means, the type of the cause of a failure of the bearing is judged.

We claim:

1. A method for detecting a failure of a machine comprising the steps of;

detecting output signals from said machine by the use of a detection unit;

filtering said detected signals in a low-pass filter;

converting the output of said filter to a digital output in a A/D converter;

operating upon the digital output of said converter in an arithmetic unit and comparing in a comparing unit the output of said arithmetic unit with a set value to display the possibility of failure of said machine:

performing plural operation of said detection unit, said A/D converter unit, said arithmetic unit and said comparator unit for detecting said signals and comparing the output given by said arithmetic unit with a set value to indicate the failure of said machine when said outputs of said arithmetic' unit exceed said set value a predetermined number of times.

2. The method of claim 1 wherein said arithmetic unit provides peak values of the detected signals.

3. The method of claim 1 wherein said arithmetic units provides peak values and effective values of the detected signals.

4. The method of claim 1, 2 or 4 wherein the signals generated from said machine are signals for vibration of a bearing of a rotary machine.

5. The method of claim 1, 2 or 3 wherein the signals generated from said machine are sound signals generated by a bearing of a rotary machine.

* * * * *